US005257304A

United States Patent [19]

Sireul et al.

[11] Patent Number: 5,257,304

[45] Date of Patent: Oct. 26, 1993

[54] HIGH-VOLTAGE POWER DEVICE AND POWER PACK FOR X-RAY TUBE

[75] Inventors: Jacques Sireul, Wissous; Hans Jedlitschka, Chatillon; Dominique Poincloux, Guyancourt, all of France

[73] Assignee: General Electric CGR S.A., Mouloineaux, France

[21] Appl. No.: 936,381

[22] Filed: Aug. 28, 1992

[30] Foreign Application Priority Data

Sep. 3, 1991 [FR] France ............................... 91 10888

[51] Int. Cl.[5] ....................... H05G 1/10; H01F 15/02; H02M 7/10

[52] U.S. Cl. .................................... 378/101; 378/104; 378/105; 363/68; 363/59

[58] Field of Search ............... 378/101, 104, 105, 200, 378/202; 363/68, 61, 126, 59

[56] References Cited

U.S. PATENT DOCUMENTS

| | | | |
|---|---|---|---|
| 3,541,424 | 11/1970 | Tada et al. . | |
| 3,611,032 | 10/1971 | Skillicorn | 361/35 |
| 4,338,657 | 6/1982 | Lisin et al. | 363/68 |
| 4,569,010 | 2/1986 | Klokkers et al. | 363/68 |
| 4,587,606 | 5/1986 | Sanada | 378/104 |
| 4,807,105 | 2/1989 | Varjasi et al. | 363/68 |
| 5,003,452 | 3/1991 | Sireul et al. | 378/104 |
| 5,060,253 | 10/1991 | Jedlitschka et al. | 378/101 |
| 5,166,965 | 11/1992 | Collier | 378/101 |

FOREIGN PATENT DOCUMENTS

| | | |
|---|---|---|
| 116996 | 8/1984 | European Pat. Off. . |
| 430755 | 6/1991 | European Pat. Off. . |

OTHER PUBLICATIONS

WO 86/06892–Nov. 1986–see abstract.

*Primary Examiner*—David P. Porta
*Assistant Examiner*—Kim-Kwok Chu
*Attorney, Agent, or Firm*—Cushman, Darby & Cushman

[57] ABSTRACT

In a high-voltage power device for X-ray tubes, a single magnetic circuit is used to couple a primary circuit to two separate secondary circuits. Each of these secondary circuits comprises a series of secondary windings, each connected to a rectifier-doubler circuit constituted by diodes, borne by a printed circuit, and by capacitors, borne in a cellular compartment. This arrangement makes it possible notably to double the output high voltage or to obtain perfectly symmetrical high voltages in a device that occupies less space.

18 Claims, 5 Drawing Sheets

HIGH-VOLTAGE POWER DEVICE AND POWER PACK FOR X-RAY TUBE

BACKGROUND OF THE INVENTION

1. Field of the Invention

The invention relates to electrical devices that are used to supply X-ray tubes.

An X-ray tube comprises a cathode having a filament that emits an electron beam towards an anode or anticathode. The anode is constituted by a material such as tungsten or molybdenum which emits X-rays when it is bombarded by the electron beam coming from the cathode. To obtain a high-energy electron beam, the electrons are accelerated by a high electrical field created between the cathode and the anode. To this end, the anode is taken to a positive potential of several tens of kilovolts with respect to the cathode. This potential may exceed hundred kilovolts and reach 140 kilovolts and more.

2. Description of the Prior Art

Such high voltages are given by so-called high-voltage power devices which, as can be seen in FIG. I, include a transformer 10 that is connected to voltage rectifier-doubler circuits 11. More specifically, the transformer 10 comprises a single primary winding 12 to which there is applied an AC voltage and a secondary circuit 13 which is connected to the voltage rectifier-doubler circuits il. In a standard way, each voltage rectifier-doubler circuit 11 consists of a secondary winding 14, two diodes D1 and D2 and two capacitors C1 and C2 which are connected to each other according to the diagram of FIG. 1. Each voltage rectifier-doubler circuit is connected to the next one in such a way that the output voltages of these rectifier-doubler circuits get added up, thus making it possible to obtain a very high voltage at the last doubling circuit of the assembly.

More specifically, the transformer 10 comprises a primary winding 12 and twelve secondary windings S1 to S12 of which only the elements S1, S5, S6 and S12 have been shown. Similarly, it has 24 identical rectifier diodes D1 to D24 of which only the elements D1, D2, D3, D12, D13, D14, D22, D23, D24 have been shown. Clearly, each diode may be replaced by several diodes in series to take account of the reverse voltage of the diodes.

The transformer 10 also includes 24 filtering capacitors C1 to C24, of which only the elements C1, C2, C3 ... C12, C13, C14 ... C23, C24 have been shown.

Each secondary winding SI to S12 has two output terminals. All the output terminals bear the references B1 to B24. Only the terminals B1, B2, B3 ... B5, B6, B7, B8 ... B23, B24 have been shown.

In FIG. 1, the common point of the capacitor Cl and of the diode D1 constitutes the high voltage (HT) output terminal 46 through a resistor R while the common point of the capacitor C24 and of the diode D24 constitutes the ground output terminal with which a discharge gap 9 is associated.

To measure the amplitude of the high voltage, the high-voltage output terminal 46 is connected to a measuring device (not shown) connected to the point M by means of a resistor R and a variable capacitor C. The point M is connected to the ground by a discharge gap 8.

In one typical exemplary embodiment, each rectifier-doubler circuit has an output voltage of six kilovolts in such a way that, at output of the twelfth rectifier-doubler circuit, the voltage is equal to 72 kilovolts.

It will be noted that, to obtain a potential difference of the order of 140 kilovolts between the cathode and the anode of an X-ray tube, it is enough to connect the cathode to a negative potential of 70 kilovolts with respect to the ground and the anode to a positive potential of 70 kilovolts with respect to the ground. To this effect, two supply devices, identical to that of FIG. 1 are used.

It will be understood that the making of a high-voltage power device according to the circuit of FIG. 1 leads to problems of insulation that are often resolved by moving the conductors with greatly different potentials away from one another and by interposing, between them, an insulating medium such as oil which acts, at the same time, as a cooling liquid. This results then in large-sized devices which take up a lot of space.

Furthermore, the X-ray tubes are increasingly being used in pulsed mode according to increasingly high frequencies. In the circuit of FIG. 1, this means that the primary winding is supplied by an AC voltage with a high frequency, of the order of several tens of kilohertz. Under these new conditions of operation, the performance characteristics of the circuit of FIG. 1 are limited by the parasitic capacitance and self-inductance of the conductors and windings of the transformer, the values of which are difficult to ascertain and compensate for.

In the U.S. Pat. No. 5,003,452, the Applicant for the present application has described a power device in which the relative positions of the different elements lead to minimize the parasitic capacitance and self-inductance values and contribute to reducing the space occupied by the unit while at the same time facilitating the manufacturing process.

Furthermore, through the making of the secondary circuit in the form of concentric windings, only the parasitic capacitance between the first secondary winding and the ground has an influence, for the other parasitic capacitances between the secondary windings are not considered because they are at an AC voltage.

Finally, to limit the lengths of the connection conductors that link the output terminals B1 to B24 of the secondary windings S1 to S12, on the one hand to the diodes D1 to D24 and on the other hand to the capacitors C1 to C24, the invention described in the above-mentioned patent provides, firstly, for making secondary windings, of which the similar odd-order output terminals B1, B3 ... B23 are positioned on a first lateral side of the windings while the even-order output terminals B2, B4 ... B24 are positioned on the other or second lateral side of the secondary windings. There is then provision for grouping the diodes D1 to D24 together on a same support which is positioned on the same side as the output terminals B1, B3 ... B23 of the secondary windings, and for making their connections, firstly, to the diodes D1 to D24 on the first lateral side of the secondary windings and, secondly, to the output terminals B2, B4 ... B24 on the second lateral side of the secondary windings.

Given the power values to be used, the high-voltage power device described in the above-mentioned U.S. patent is placed in a chamber filled with an insulating coolant and the assembly constitutes what is called a high-voltage unit or high voltage pack.

To cool a supply device such as this, comprising a primary winding, secondary windings and other components such as diodes, a substantial volume of cooling liquid, equal to about 15 to 20 liters, is needed. This volume entails a fairly bulky high-voltage pack.

To reduce the space occupied by a high-voltage pack such as this, it has been proposed to position the primary circuit and the magnetic circuit outside the chamber containing the cooling liquid. Said chamber then contains only the secondary circuits and associated components which are taken to high voltages of several kilovolts while the primary circuit is at a relatively low voltage of some hundreds of volts.

A high-voltage pack such as this has been described in the U.S. Pat. No. 5,060,253

A high-voltage pack such as this, apart from its reduction in volume, has satisfactory electrical characteristics for most of the current applications and can thus be used to achieve high voltages of more than 100 kilovolts.

However, since the trend is towards the application of even higher values of high voltages to the X-ray tube and towards increasing the power delivered by the X-ray tubes, a high-voltage pack such as this has certain limitations due to the heating of the secondary circuits and of the rectifier diodes.

Furthermore, the magnetic circuits that may be used are of the type resulting from the combination of a first C-shaped or horseshoe-shaped circuit and a second I-shaped circuit which closes the first circuit. Now, the maximum surface area of the window of passage of such magnetic circuits is limited: this limits the surface area available for the windings.

Finally, if the secondary circuits are connected so as to apply a positive high voltage to the anode and a negative high voltage to the cathode, of the order of 75 kilovolts each, it is difficult if not impossible to obtain perfect symmetry between the two high voltages. Indeed, since the midpoint corresponds to one of the secondary windings, the negative high voltage will correspond, for example, to windings close to the magnetic circuit while the positive high voltage will correspond to windings remote from the magnetic circuit. In this arrangement, the result is that the positive high-voltage windings are subjected to a magnetic flux that is weaker than that undergone by the negative high-voltage windings. It is obviously possible to correct this dissymmetry by providing for a smaller number of turns for the windings of the negative high voltage (internal layers) than for the windings of the positive high voltage (external layers). Corrections such as these complicate the making of a high-voltage pack such as this with symmetrical high voltages without thereby in any way achieving perfect symmetry.

An object of the present invention, therefore, is to make a high-voltage power device and, more particularly, a high-voltage power pack that can provide power at least double that of the power devices and packs described in the above-mentioned patents.

Another object of the present invention is to make a high-voltage power pack that can give perfectly symmetrical high voltages.

These different objects are achieved by the use of two separate secondary circuits that are coupled to at least one primary circuit by means of a magnetic circuit, the passageway window of which is doubled in area by the combination of two C-shaped or horseshoe-shaped magnetic circuits that are positioned so as to face each other.

The fact of using two separate secondary circuits makes it possible to double the number of diodes, thus promoting improved voltage strength when the two secondary circuits are series-connected or an increase in the current when the two secondary circuits are parallel-connected.

Should the two secondary circuits be identical, it is possible to obtain high voltages that are perfectly symmetrical with respect to the ground by connecting the secondary circuits in series and by connecting the connection point to the ground.

SUMMARY OF THE INVENTION

The invention relates to a high-voltage power device for an X-ray tube having a transformer that comprises at least one primary winding, a plurality of secondary windings and a magnetic coupling circuit between said primary winding and said secondary windings, the two output terminals of each of said secondary windings being connected to a voltage rectifier-doubler circuit that is constituted by two diodes and two filtering capacitors, said rectifier-doubler circuits being connected to each other so that their output voltages get added up, the primary and secondary windings being formed by concentric coils, the output terminals of said secondary windings being distributed on each lateral side of said coils, the capacitors being positioned on the external periphery of the coils and the diodes being positioned on a lateral side of said coils, wherein:

- the plurality of said secondary windings is split up into two series (SI to S12 and S'1 to S'12) each of which corresponds to a separate secondary circuit;

- the coils of said secondary windings (SI to S12) of one series are separated axially from the coils of the secondary windings (S'1 to S'12) of the other series;

said filtering capacitors of each separate secondary circuit are positioned on the external periphery of said coils of each series, and

- said diodes are positioned on a lateral side of said coils of each series.

BRIEF DESCRIPTION OF THE DRAWINGS

Other objects, features and advantages of the present invention shall appear from the following description of a particular exemplary embodiment, said description being made with reference to the appended drawings, of which.

- FIG. I is a standard electrical diagram of a high-voltage power device for an X-ray tube.

In the different figures, the same references designate identical elements.

MORE DETAILED DESCRIPTION

Figure 1:
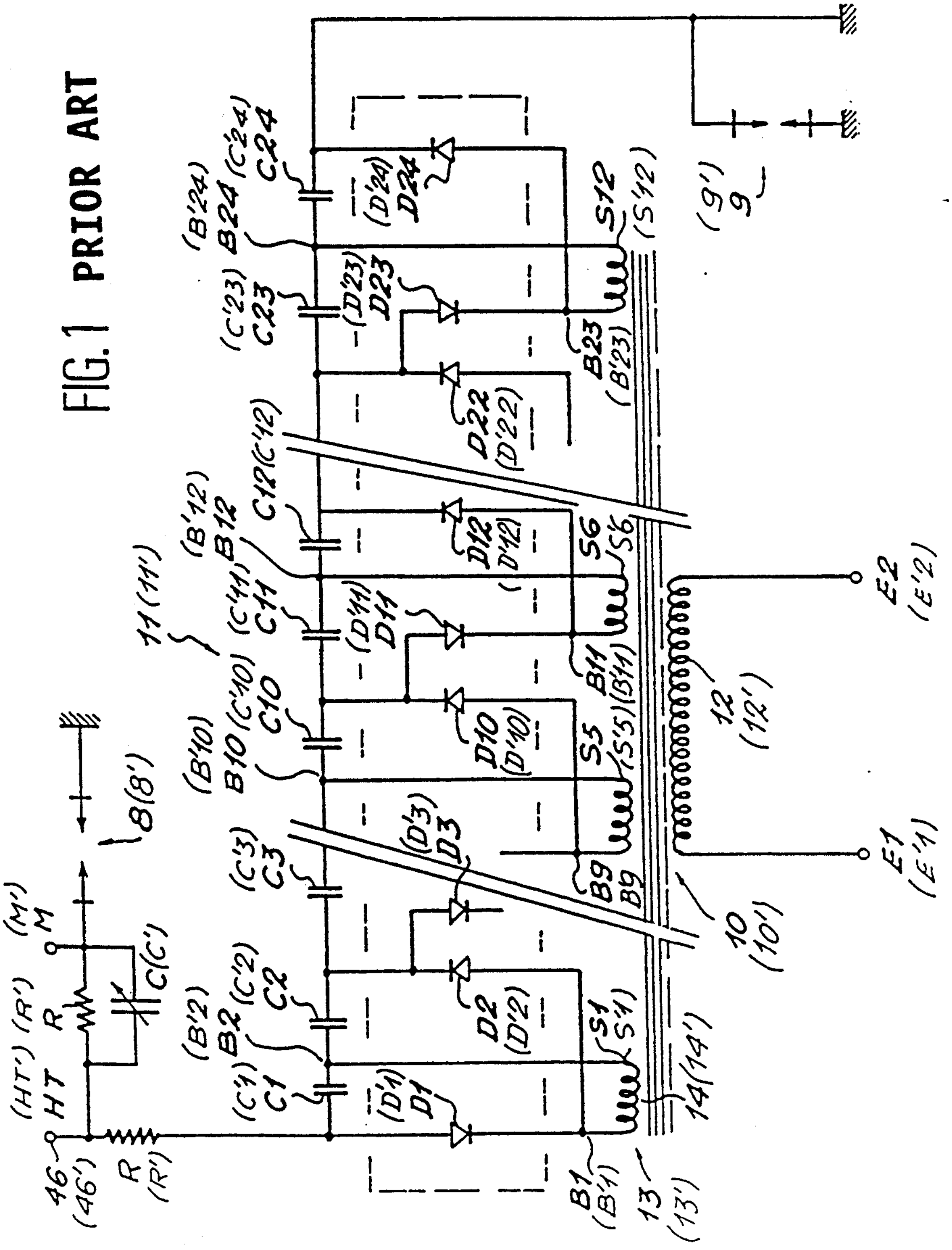
FIG. 1 PRIOR ART
Figure 2:
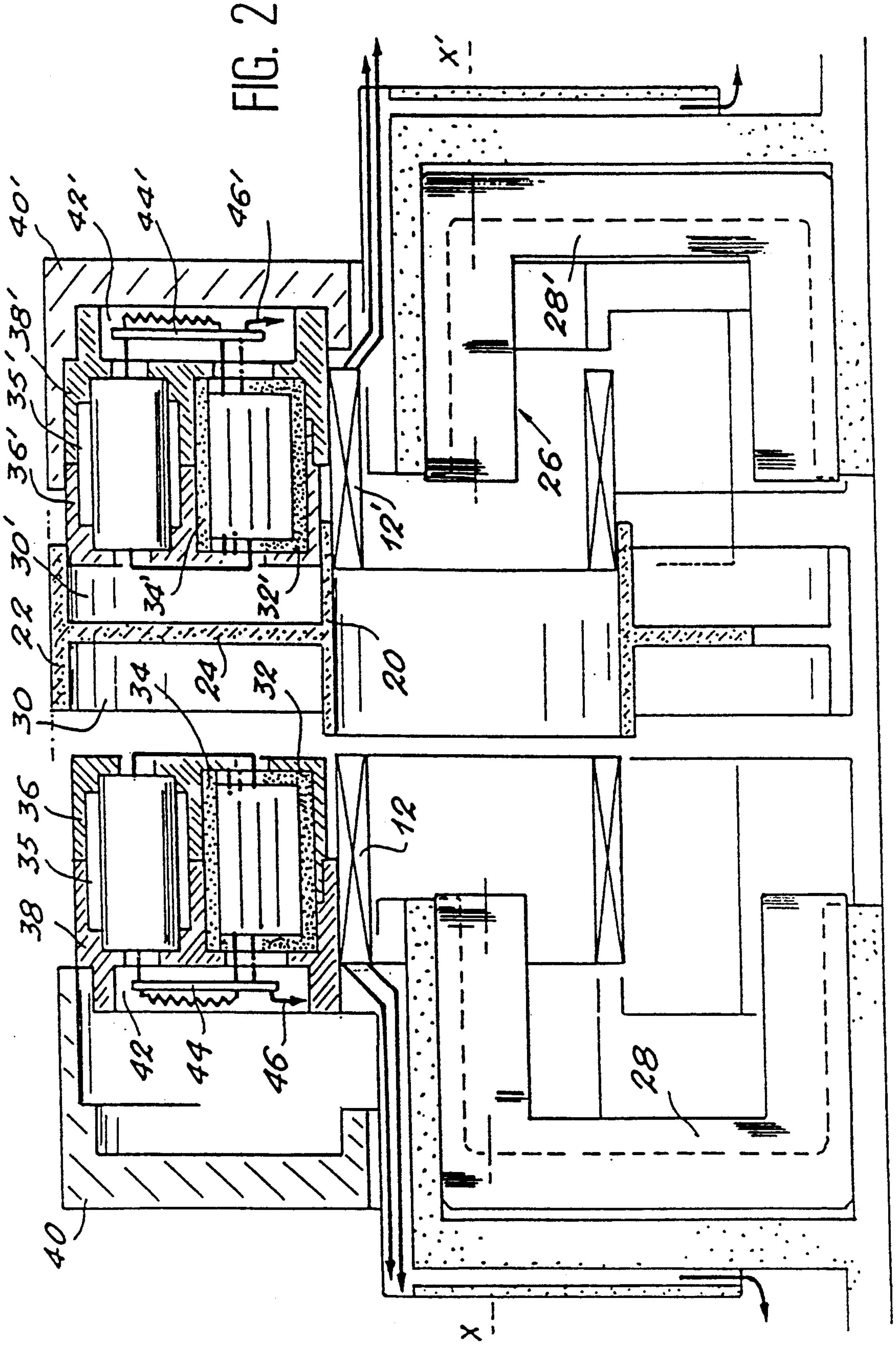
- FIG. 2 is an exploded sectional view of a part of the power device according to the invention along a longitudinal axis X'X passing through the axis of symmetry of the coils of the windings of the transformer.

FIG. 1, which shows the standard electrical diagram of a high-voltage power device for an X-ray tube, shall not be described again but is an integral part of the description of the invention. Indeed, in its purely functional aspect, the invention consists in making two secondary circuits, each identical to that of the electrical diagram of FIG. and in mechanically coupling their windings to a primary circuit by means of a magnetic circuit. For the sake of clarity, the elements of a first secondary circuit shall be referenced with the references of FIG. while the identical elements of the second secondary circuit shall be referenced with prime signs (40 ) as indicated by the references given within brackets. The different mechanical elements for the supporting and holding of the different components of the two secondary circuits and of the primary circuit as well as their electrical connections with one another shall be described in relation with FIGS. 2 to 6.

The central element is constituted by two cylinders 20 and 22 which are hollow and concentric and are fixedly joined to each other by a median partition wall 24. Two primary windings 12 and 12' are placed on the internal periphery of the hollow cylinder 20, the inner space that has remained free being occupied by the inner arm of a magnetic circuit 26. The magnetic circuit 26 is formed by two identical C-shaped or horseshoe-shaped elementary magnetic circuits 28 and 28' that are attached by their opening. In FIGS. 1, 2, 3 and 6, it has been assumed that there are two primary windings 12 and 12'; however, in most of the applications, only one winding will be preferably used.

The two cylinders 20 and 22 mutually define an annular compartment 30 and 30' on either side of the median partition 24. This annular compartment 30 and 30' serves as a housing for supporting elements of each secondary circuit. The secondary windings S1 to S12 (or S'1 to S'12) are coiled on an annular mandrel or spindle 32 (or 32') closed by a cylindrical lid 34 (or 34'). This spindle 32 (or 32') gets fitted into the external periphery of the cylinder 20 in the annular compartment 30 (or 30').

The capacitors Cl to C24 (or C'1 to C'24) are positioned in housings or receptacles such as those referenced 35 (or 35') which are formed, for example, by the assembling of two annular compartments 36, 38 (or 36', 38') each having housings or cells having the shape of the capacitors C1 to C24 (or C'1 to C'24). The annular compartment 38 (or 38') furthest from the median partition 24 is held in assembly by any known means and, notably, by a ring-shaped lid 40 (or 40') that gets fitted into the external periphery of the cellular compartments 36, 38 (or 36', 38'). In particular, an annular space 42 (42') is left free between, firstly, the bottom of the lid 40 (or 40') and, secondly, both the spindle 32 (or 32') and the cellular compartment 38 (or 38'), for the positioning of the rectifier diodes D1 to D24 (or D'1 to D'24). These diodes are fixed to a printed circuit 44 (or 44') shaped like an annular sector (FIG. 4) which is fixedly joined, for example, to the cellular compartment 38 (or 38'). This printed circuit 44 (or 44') sets up the connections of the diodes D1 to D24 (or D'1 to D'24) with one another, with one of the capacitors of the terminals Cl to C24 (or C'1 to C'24) and with the odd-order output terminals B1, B2 B23 (or B'1, B'3 ... B'23) in accordance with the electrical diagram of FIG. 1.

Figure 4:
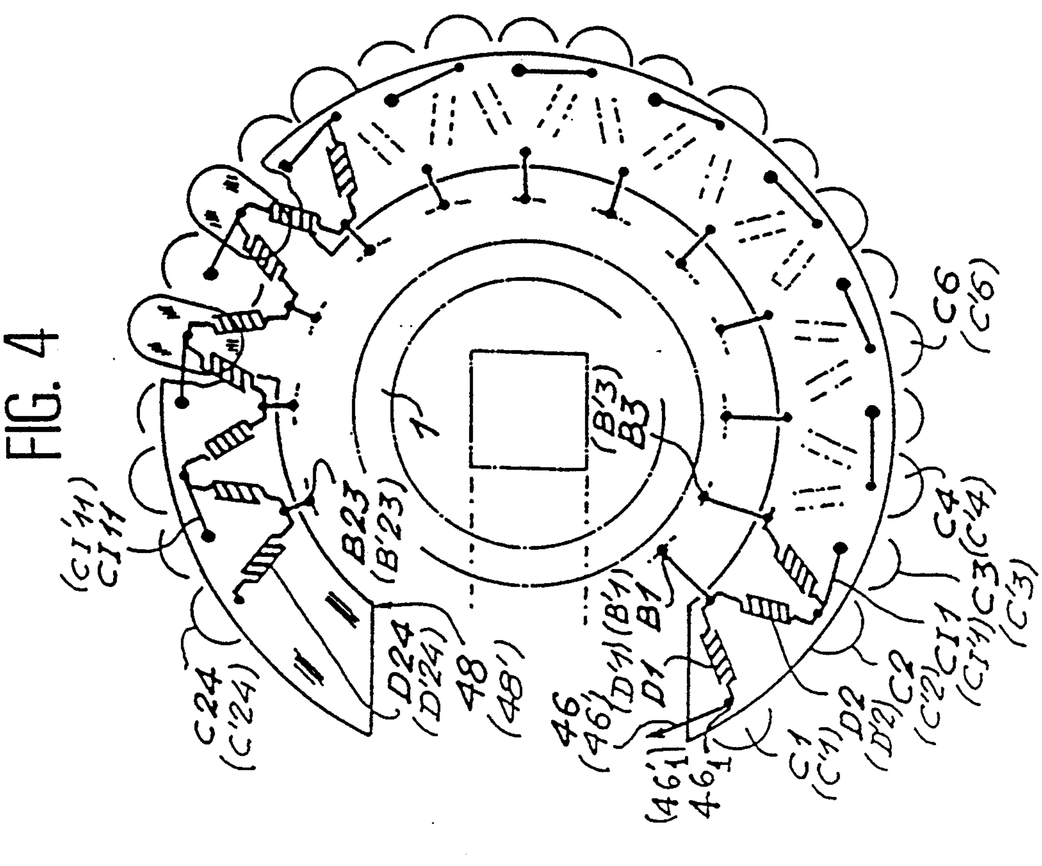
- FIG. 4 shows a top view of the element on which the rectifier diodes for the secondary voltages are positioned and electrically connected.

It is thus that, for example, in FIG. 4, the diode D1 (or D'l) has its cathode which is connected to the terminal B1 (or B'1) of the winding SI (or S'I) and its anode which is connected to one of the terminals of the capacitor Cl (or C'l). Besides, the terminal B1 (or B'l) is connected to the diode D2 (or D'2), the cathode of which is connected, firstly, to the anode of the diode D3 (or D'3) and, secondly, to a terminal of the capacitors C2 and C3 (or C'2 and C'3) and to this terminal by a printed conductor C11 (or C1'l). It will be observed that the other printed conductors C12 to C111 (or CI'2 to CI'll) connect the other common points of diodes equivalent to D2, D3 (or D'2, D'3) to capacitors equivalent to C3 (or C'3).

Figure 5:
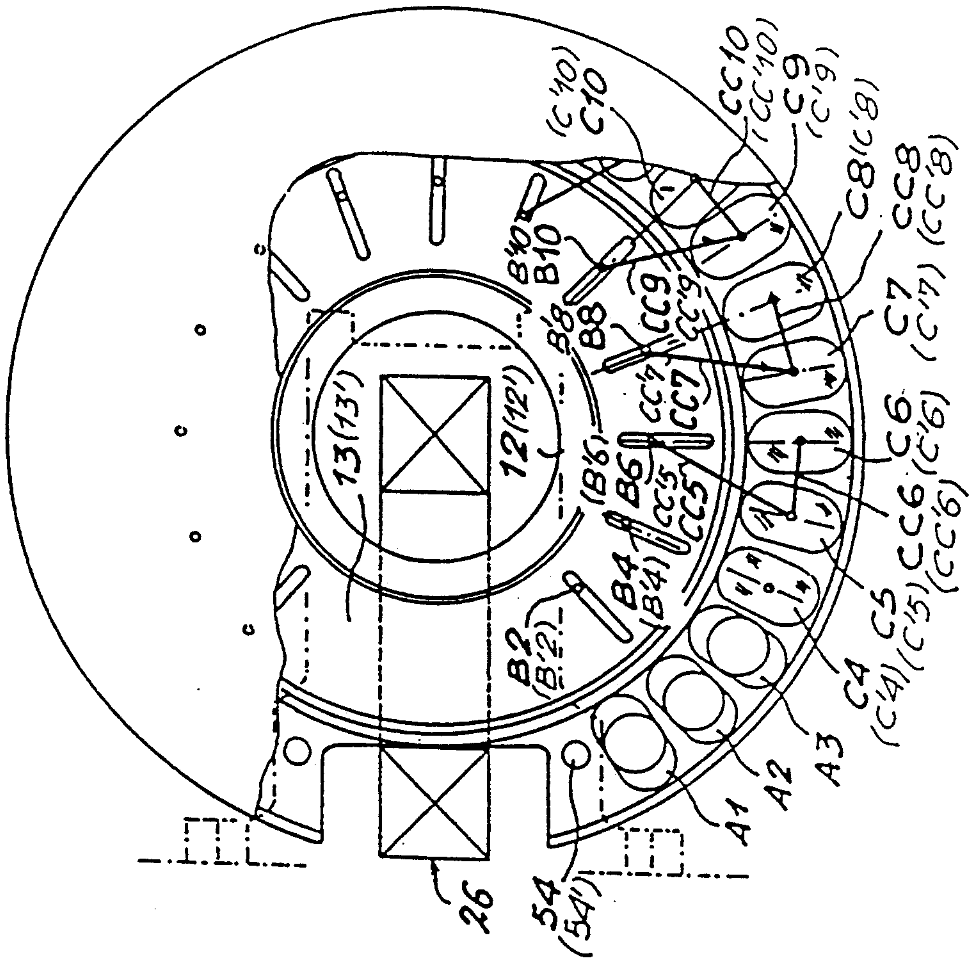
- FIG. 5 shows a top, partially cutaway view, notably showing the housings or receptacles for the filtering capacitors for the secondary voltages rectified by the diodes.

On the median partition 24 side, there is also provision for sufficient space to make the electrical connections between the other even-order terminal B2 to B24 (or B'2 to B'24) of the secondary windings S1 to S12 (or S'1 to S'12) and the other terminal of the associated capacitors. FIG. 5 shows only the connection conductors CC5 to CC10 (CC'5 to CC'10) between B6, B8 and B10 (B'6, B'8 and B'10) and the associated capacitors C5 and C6 (or C'5 and C'6), C7 and C8 (or C'7 and C'8) and C9, C10 (or C'9, C'10). Naturally, these conductors CC5 to CC10 can be made as conductors of a printed circuit analogous to the printed circuit 44 (or 44') bearing the diodes, or as linear arrays.

The high voltage that is given by each secondary circuit is taken at a terminal 461 (or 46'I) of the printed circuit 44 (or 44').

In order to allow the passage of the external arm of the magnetic circuit 26, certain support elements of the primary and secondary circuits, namely the partition 24, the cylinder 22, the half-shells 36, 38, 36', 38', the annular parts 44, 44'and the lids 40, 40' should have a notch 48 (or 48').

The different elements that have just been described are assembled by being fitted into each other and their assembling can be maintained by two tie rods according to the embodiment described in the above-mentioned U.S. Pat. No. 5,003,452. Then the unit that results from this assembling operation, including the primary circuit and the magnetic circuit, may be positioned in a circuit filled with an insulating and coolant liquid.

However, it is preferable to carry out this assembling operation according to the embodiment described in the U.S. Pat. No. 5,060,253 also mentioned here above, i.e. by leaving the primary circuit and the magnetic circuit outside the cooling chamber.

Figure 3:
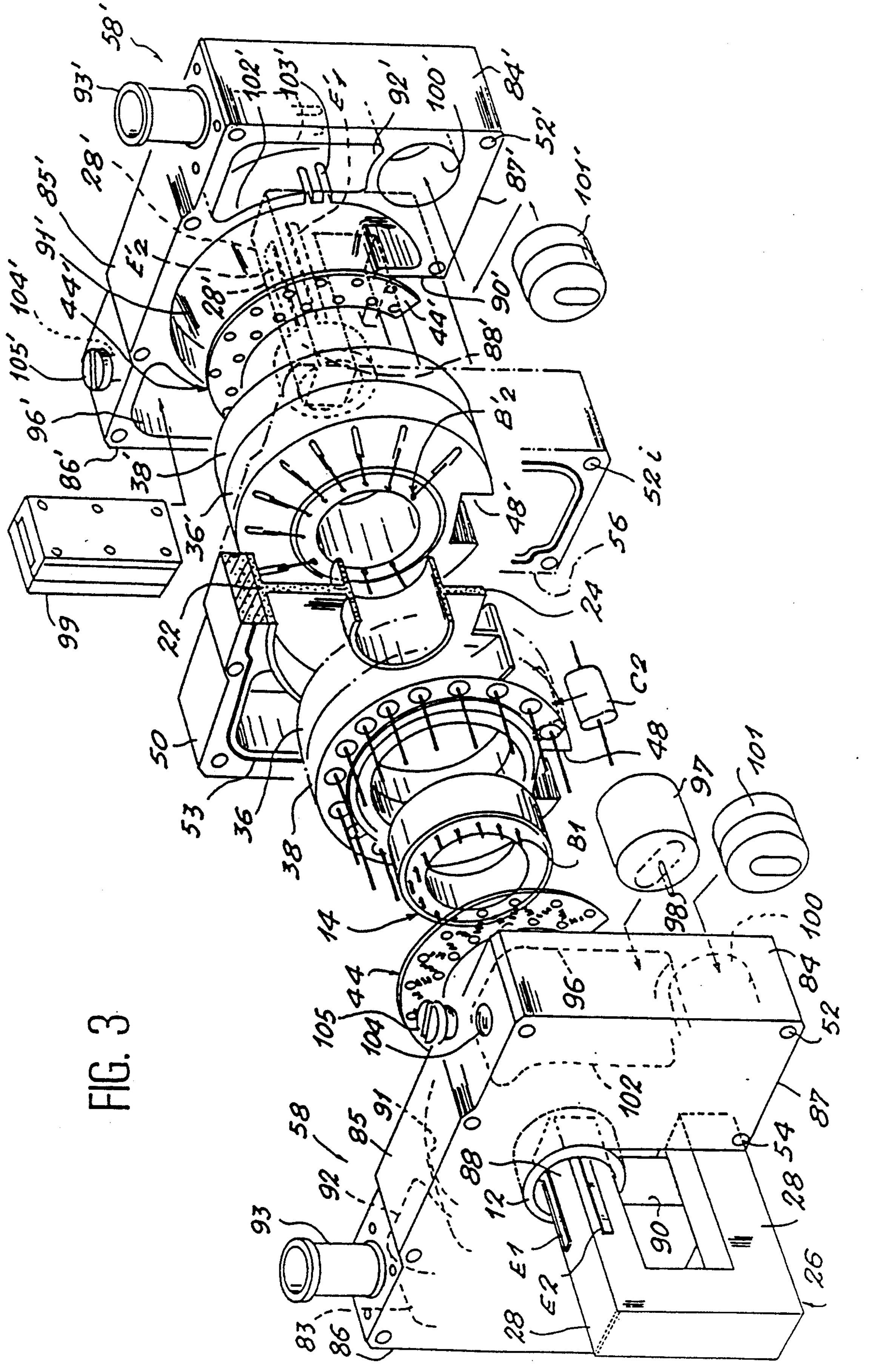
- FIG. 3 shows an exploded view of a part of the elements constituting the supply device according to the invention.
Figure 6:
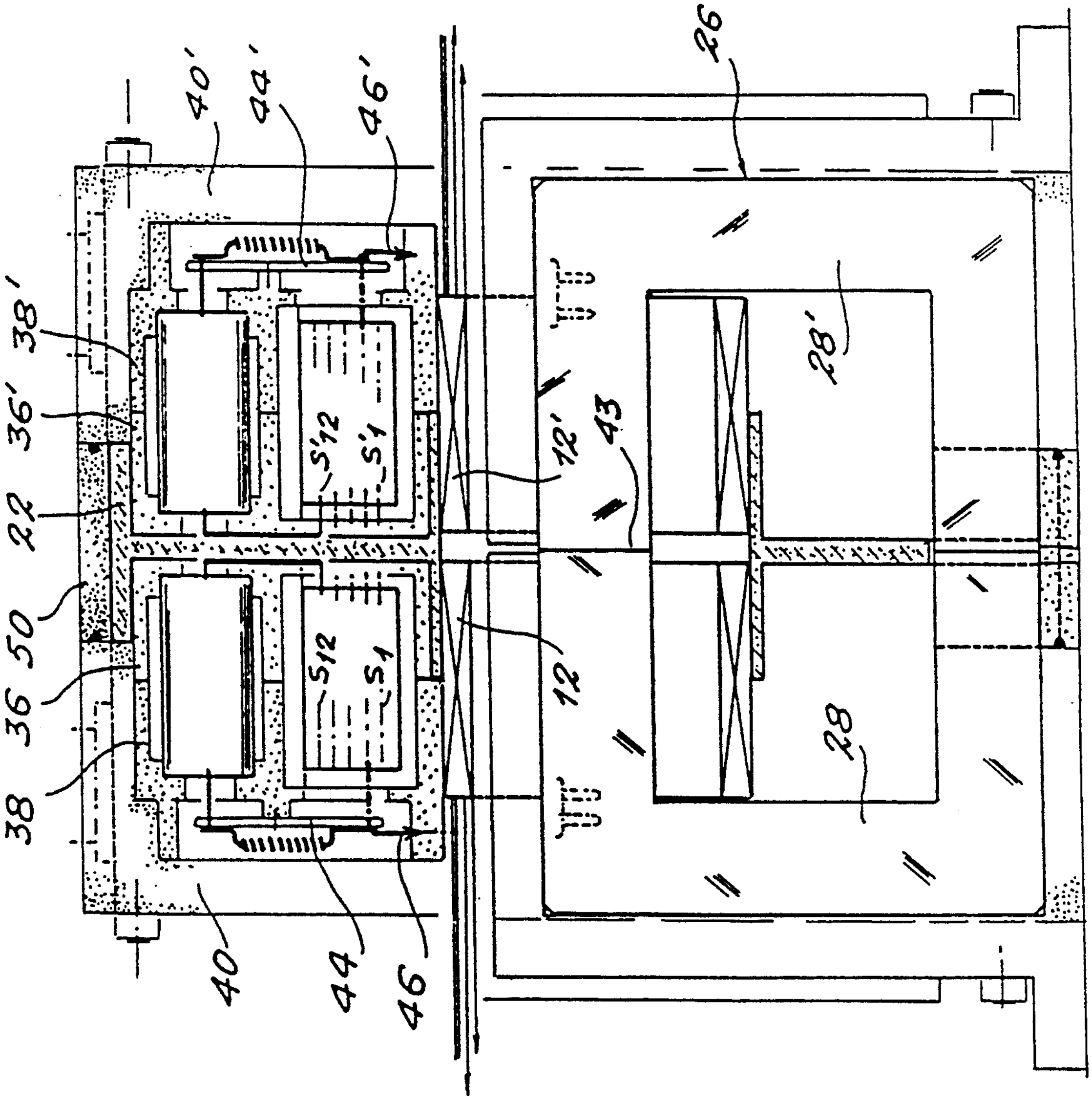
- FIG. 6 shows a sectional view of the assembly of the supply device according to the invention along the longitudinal axis X'X and passing through the magnetic circuit of the transformer.

To this effect, the same half-shells 58 and 58' are used as those of the patent application referred to in the above paragraph, forming the supports of the lids 40 and 40', and an intermediate element 50 is added to take account of the extension resulting from the presence of an additional secondary circuit. This intermediate element 50 supports the central element constituted by the concentric cylinders 20 and 22 fixedly joined together by the partition 24, as can be seen in FIGS. 3 and 6.

These two half-shells 58 and 58' are assembled to each other by means of the element 50 by means of tie rods (not shown) going through holes such as those referenced 52, 52', 521 respectively drilled in the half-shells 58, 58' and the intermediate element 50. Seals, such as those referenced 53 on the element 50, are designed to provide for the impervious sealing of the assembly of the half-shells 58 and 58' and of the element 50.

As indicated here above, each half-shell 58, 58' is shaped substantially in the same way to act as a mounting support for a certain number of elements. Thus, each half-shell 58 (or 58') respectively comprises a back wall 83 (or 83') and side walls 84 (or 84'), 85 (or 85'), 86 (or 86'), 87 (or 87'). Each back wall has a hollow central cylinder (hole 88 or 88') which goes through each half-shell 58 (or 58') and abuts an edge of the cylinder 20 during the assembling, by means of a seal (not shown).

Each half-shell 58 (or 58') has an L-shaped notch 90 (or 90'), the vertical arm of which is located on the back wall 83 (or 83') while the horizontal arm is located on the lateral wall 87 (or 87'). The notch of the vertical arm has a depth smaller than that of the thickness of the half-shell and the notch of the horizontal arm has a depth smaller than the distance from the hollow cylinder to the lateral wall 87 (or 87').

The intermediate element 50 also has a notch 56 facing notches 90 and 90'.

These different notches 90, 90'and 56 are used to house one of the longitudinal arms of the magnetic circuit 26, the other arm being housed in the hollow cylinders 88, 88' and inside the cylinder 20 of the intermediate element 50.

The internal volume of each half-shell comprises housings to enabling the positioning and maintaining of the elements of the secondary circuit as well as other elements that shall be indicated hereinafter.

It is thus that a first housing 91 (or 91') is provided around the hollow cylinder 88 (or 88') for the supporting and maintaining of the secondary windings SI to S12 (or S'l to S'12) positioned in the spindle 32 (or 32'') and the capacitors Cl to C24 (or C'I to C'24) positioned in the cellular compartments 36, 38 (or 36', 38'). The housing 91 (or 91') is deep enough to house the printed circuit 44 (or 44') to which the diodes D1 to D24 (or D'I to D'24) are fixed. A second housing 92 (or 92') is made in the half-shell 58 (or 58') to position a high-voltage output connector 93 (or 93'), one of the terminals of which is connected to the high-voltage terminal 46 (or 46') (FIG. 1).

Each connector 93 (or 93') is formed in a standard way by a sleeve, one closed end of which bears the connection pads located in the housing 92 (or 92') near the high-voltage output terminal 46 (or 46').

The other end of the sleeve of the connector is open and acts as a passage for the output conductors by means of a male contact (not shown) that is mounted in a hermetically sealed way in a hole in the side wall 85 (or 85') by means of a seal and a plate (not shown) screwed into the lateral wall.

A fourth housing 96, positioned for example in the half-shell 58, enables the positioning of a cell 97, filled with air, to absorb the expansions of the insulating and cooling medium. The interior of this expansion cell communicates with the exterior of the vessel by means of a conduit 98.

A fifth housing 96', positioned in the half-shell 58', enables the positioning of a voltage-measuring electrical circuit 99. This electrical circuit is constituted, as indicated with reference to FIG. 1, by a resistor R and a variable capacitor C connected in parallel and by a discharge gap 9.

A sixth housing 100 in the shell 58 is designed to position and maintain a first transformer 101 to supply a first filament of the cathode of the tube.

A seventh housing 100' in the half-shell 58' is designed to position and maintain a transformer 101' to supply a second filament of the cathode of the tube.

The different housings that have just been described are separated by walls such as the one referenced 102 (or 102'), the shapes of which match those of the elements that they have to hold. These walls are drilled with holes such as the one referenced 103' in the wall 102' to enable the flow of insulating and coolant liquid.

For the filling of the tank, formed by the assembling of the two half-shells 58, 58' and the intermediate element 50, with the insulating and coolant liquid, there is provision for two holes 104 and 104', drilled respectively in the lateral walls 85 and 85' and provided respectively with caps 105 and 105'.

Other inlet and outlet holes may be provided if a circulation of the insulating and coolant medium is planned.

After the mounting and wiring of the different elements of the secondary circuits in the half-shells 58 and 58' and the intermediate element 50, this intermediate element is assembled with the half-shells in such a way as to form an imperviously sealed tank inside which there are mounted the different elements of the primary circuit and of the magnetic circuit.

Thus, the primary winding or windings 12 and 12' are positioned inside the cylinder 20 and the hollow cylinders of the half-shells 58 and 58' while the horizontal internal arms of the magnetic half-circuits 28 and 28' go through the cylinder 20 and the hollow cylinders 88 and 88' inside the primary winding or primary windings 12 or 12' so that one abuts the other along the line 43 on their faces that are before each other.

The external horizontal arms of the magnetic circuits get housed in the notches 90, 90' and 56. The vertical arms of the magnetic circuits get housed in the vertical parts of the notches 90 and 90'.

To hold the different elements of the magnetic circuit 26 in position with respect to one other, there is provision for means (not shown in the figures) that are within the scope of those skilled in the art, for example plates that can be applied to the vertical arms of the magnetic circuit and are fixed to half-shells 58 and 58'. These plates can also be used as a support for a fan (not shown) to cool the primary winding and the magnetic circuit by effecting a forced and fast flow of air within the hollow cylinders 88 and 88' and the cylinder 20.

As in the U.S. Pat. No. 5,060,253, the half-shells 58, 58' and the intermediate element 50 are made out of an insulator material such as a plastic material. In order to set up electrical protection, the external wall of the elements 58, 58' and 50 is coated with a metal jacket or with a conductive layer that is made in such a way that it does not short-circuit the secondary windings. The metal jacket or the conductive layer is connected to the ground.

With the device and the high-voltage power pack that have just been described, the use of a magnetic circuit 26, formed by two horseshoe-shaped (C-shaped) magnetic half-circuits 28 and 28' makes it possible to double the area of the window and hence to couple two secondary circuits with the primary circuit or circuits by means of the same magnetic circuit.

These two secondary circuits can be connected in parallel or in series. In a parallel connection, the number of turns of each winding may be distributed over the two coils, thus making it possible to increase the section of the conductive wire and hence to increase the power.

In a series connection, a secondary circuit is assigned to the production of the positive voltage while the other secondary circuit is assigned to the production of the negative voltage: this doubles the voltage at constant current.

In the case of a series connection of the two secondary circuits at a single point which constitutes their midpoint connected to the ground, the intrinsic dielectric strength of the assembly is equal to that of a single secondary circuit, owing to the independence of each of the secondary circuits. Consequently, seen from the outside, the output voltage may be doubled without affecting the safety margins as regards voltage value.

Since the secondary circuits may be built identically, and since they are positioned under the same conditions of magnetic flux and geometry with respect to the magnetic circuit, the device of the invention makes it possible to obtain high voltages that are perfectly equal at the terminals of each secondary circuit and hence makes it possible to obtain high voltages that are perfectly symmetrical when the secondary circuits are series connected.

What is claimed is:

1. A high-voltage power device for an X-ray tube having a transformer that comprises at least one primary winding, a plurality of secondary windings each having two output terminals and a magnetic coupling circuit, the two output of terminals of each of said secondary windings being connected to a voltage rectifier-doubler circuit that is constituted by two diodes and two filtering capacitors, said rectifier-doubler circuits being connected to each other so that their output voltages get added up, the primary and secondary windings being formed by concentric coils, the output terminals of said secondary windings being distributed on each lateral side of said coils, the capacitors being positioned on the external periphery of said coils and the diodes being positioned on a lateral side of said coils, wherein:

- the plurality of said secondary windings is split up into two series each of which corresponds to a separate secondary circuit;
- the coils of said secondary windings of one series are separated axially from the coils of the secondary windings of the other series;

said filtering capacitors of each separate secondary circuit are positioned on the external periphery of said coils of the associated series of secondary windings, and

- said diodes are positioned on a lateral side of said coils of the associated series of secondary windings.

2. A device according to claim i, wherein the coils of the secondary windings of a series are separated from the coils of the secondary windings of the other series by an electrically insulating partition wall which is positioned perpendicularly to the axis of the said coils.

3. A device according to claim 2, wherein said insulating partition wall is annular and acts as a support for two cylinders, one positioned inside the ring forming a partition and the other positioned outside said ring, said cylinders defining an annular space on either side of the partition wall, each annular space being used to house the coils of the secondary windings and the associated capacitors.

4. A device according to claim 3, wherein at least one primary winding as well as one arm of said magnetic circuit are positioned inside the internal cylinder of the annular partition wall.

5. A device according to claim 3 or 4, wherein the secondary windings of a series are coiled on a same spindle, the periphery of which is closed by a lid.

6. A device according to claim 5, wherein said capacitors of each series of secondary windings are positioned and maintained in housings made in two concentric half-shells that fit into each other, the set of two half-shells being fitted, on one side, into said annular space and, on the other side, into a hollow, annular lid.

7. A device according to claim 5, wherein the partition wall, the external cylinder, the half-shells, the annular parts and the lids have a notch for the passage of the other arm of the magnetic circuit.

8. A device according to claim 5, wherein the hollow external cylinder and the lids are each borne by an external structure, said external structures being designed to get assembled with one another in an imperviously sealed manner.

9. A device according to claim 6, wherein each lid has an internal surface that is shaped so as to define an annular space for the positioning of an annular part used as a support for said diodes.

10. A device according to claim 3 or 4, wherein said capacitors of each series of secondary windings are positioned and maintained in housings made in two concentric half-shells that lift into each other, the set of two half-shells being fitted, on one side, into said annular space and, on the other side, into a hollow, annular lid.

11. A device according to claim 10, wherein the hollow external cylinder and the lids are each borne by an external structure, said external structures being designed to get assembled with one another in an imperviously sealed manner.

12. A device according to claim 10, wherein the partition wall, the external cylinder, the half-shells, the annular parts and the lids have a notch for the passage of the other arm of the magnetic circuit.

13. A device according to claim 10, wherein each lid has an internal surface that is shaped so as to define an annular space for the positioning of an annular part used as a support for said diodes.

14. A device according to claim 13, wherein the partition wall, the external cylinder, the half-shells, the annular parts and the lids have a notch for the passage of the other arm of the magnetic circuit.

15. A device according to claim 13, wherein the hollow external cylinder and the lids are each borne by an external structure, said external structures being designed to get assembled with one another in an imperviously sealed manner.

16. A device according to any one of the claims 2 to 4 wherein the partition wall, the external cylinder, the half-shells, the annular parts and the lids have a notch for the passage of the other arm of the magnetic circuit.

17. A device according to claim 16, wherein the hollow external cylinder and the lids are each borne by an external structure, said external structures being designed to get assembled with one another in an imperviously sealed manner.

18. A device according to any one of the above claims 1 to 4, wherein the hollow external cylinder and the lids are each borne by an external structure, said external structures being designed to get assembled with one another in an imperviously sealed manner.

* * * * *